US009117400B2

United States Patent
Chaji et al.

(10) Patent No.: US 9,117,400 B2
(45) Date of Patent: *Aug. 25, 2015

(54) COMPENSATION TECHNIQUE FOR COLOR SHIFT IN DISPLAYS

(75) Inventors: G. Reza Chaji, Waterloo (CA); Joseph Marcel Dionne, Waterloo (CA); Abbas Hormati, Kitchener (CA); Tong Liu, Waterloo (CA); Stefan Alexander, Elmira (CA); Arokia Nathan, Cambridge (GB)

(73) Assignee: Ignis Innovation Inc., Waterloo, Ontario (CA)

( * ) Notice: Subject to any disclaimer, the term of this patent is extended or adjusted under 35 U.S.C. 154(b) by 403 days.

This patent is subject to a terminal disclaimer.

(21) Appl. No.: 12/816,856

(22) Filed: Jun. 16, 2010

(65) Prior Publication Data

US 2010/0315449 A1  Dec. 16, 2010

(30) Foreign Application Priority Data

Jun. 16, 2009  (CA) ..................................... 2669367

(51) Int. Cl.
*G09G 3/30* (2006.01)
*G09G 3/32* (2006.01)
(Continued)

(52) U.S. Cl.
CPC ............ *G09G 3/3208* (2013.01); *G09G 3/2074* (2013.01); *G09G 5/026* (2013.01); *G09G 2300/0452* (2013.01); *G09G 2320/0242* (2013.01); *G09G 2320/043* (2013.01); *G09G 2320/0666* (2013.01)

(58) Field of Classification Search
USPC .............................. 345/76–83, 690; 315/169.3
See application file for complete search history.

(56) References Cited

U.S. PATENT DOCUMENTS 3,506,851 A  4/1970  Polkinghorn et al.
3,774,055 A  11/1973  Bapat et al.
(Continued)

FOREIGN PATENT DOCUMENTS

CA  1 294 034  1/1992
CA  2 109 951  11/1992
(Continued)

OTHER PUBLICATIONS

Spindler et al. (System considerations for RGBW OLED displays, Journal of the SID 14/1, 2006, pp. 37-48).*
(Continued)

*Primary Examiner* — Kathy Wang-Hurst
*Assistant Examiner* — Joseph Fox
(74) *Attorney, Agent, or Firm* — Nixon Peabody LLP

(57) ABSTRACT

A system for maintaining a substantially constant display white point over an extended period of operation of a color display formed by an array of multiple pixels in which each of the pixels includes multiple subpixels having different colors, and each of the subpixels includes a light emissive device. The display is generated by energizing the subpixels of successively selected pixels, and the color of each selected pixel is controlled by the relatives levels of energization of the subpixels in the selected pixel. The degradation behavior of the subpixels in each pixel is determined, and the relative levels of energization of the subpixels in each pixel are adjusted to adjust the brightness shares of the subpixels to compensate for the degradation behavior of the subpixels. The brightness shares are preferably adjusted to maintain a substantially constant display white point.

9 Claims, 5 Drawing Sheets

(51) Int. Cl.
*G09G 3/20* (2006.01)
*G09G 5/02* (2006.01)

(56) References Cited

U.S. PATENT DOCUMENTS

| | | |
|---|---|---|
| 4,090,096 A | 5/1978 | Nagami |
| 4,160,934 A | 7/1979 | Kirsch |
| 4,354,162 A | 10/1982 | Wright |
| 4,943,956 A | 7/1990 | Noro |
| 4,996,523 A | 2/1991 | Bell et al. |
| 5,153,420 A | 10/1992 | Hack et al. |
| 5,198,803 A | 3/1993 | Shie et al. |
| 5,204,661 A | 4/1993 | Hack et al. |
| 5,266,515 A | 11/1993 | Robb et al. |
| 5,489,918 A | 2/1996 | Mosier |
| 5,498,880 A | 3/1996 | Lee et al. |
| 5,572,444 A | 11/1996 | Lentz et al. |
| 5,589,847 A | 12/1996 | Lewis |
| 5,619,033 A | 4/1997 | Weisfield |
| 5,648,276 A | 7/1997 | Hara et al. |
| 5,670,973 A | 9/1997 | Bassetti et al. |
| 5,691,783 A | 11/1997 | Numao et al. |
| 5,714,968 A | 2/1998 | Ikeda |
| 5,723,950 A | 3/1998 | Wei et al. |
| 5,744,824 A | 4/1998 | Kousai et al. |
| 5,745,660 A | 4/1998 | Kolpatzik et al. |
| 5,748,160 A | 5/1998 | Shieh et al. |
| 5,815,303 A | 9/1998 | Berlin |
| 5,870,071 A | 2/1999 | Kawahata |
| 5,874,803 A | 2/1999 | Garbuzov et al. |
| 5,880,582 A | 3/1999 | Sawada |
| 5,903,248 A | 5/1999 | Irwin |
| 5,917,280 A | 6/1999 | Burrows et al. |
| 5,923,794 A | 7/1999 | McGrath et al. |
| 5,945,972 A | 8/1999 | Okumura et al. |
| 5,949,398 A | 9/1999 | Kim |
| 5,952,789 A | 9/1999 | Stewart et al. |
| 5,952,991 A | 9/1999 | Akiyama et al. |
| 5,982,104 A | 11/1999 | Sasaki et al. |
| 5,990,629 A | 11/1999 | Yamada et al. |
| 6,023,259 A | 2/2000 | Howard et al. |
| 6,069,365 A | 5/2000 | Chow et al. |
| 6,091,203 A | 7/2000 | Kawashima et al. |
| 6,097,360 A | 8/2000 | Holloman |
| 6,144,222 A | 11/2000 | Ho |
| 6,177,915 B1 | 1/2001 | Beeteson et al. |
| 6,229,506 B1 | 5/2001 | Dawson et al. |
| 6,229,508 B1 | 5/2001 | Kane |
| 6,246,180 B1 | 6/2001 | Nishigaki |
| 6,252,248 B1 | 6/2001 | Sano et al. |
| 6,259,424 B1 | 7/2001 | Kurogane |
| 6,262,589 B1 | 7/2001 | Tamukai |
| 6,271,825 B1 | 8/2001 | Greene et al. |
| 6,288,696 B1 | 9/2001 | Holloman |
| 6,304,039 B1 | 10/2001 | Appelberg et al. |
| 6,307,322 B1 | 10/2001 | Dawson et al. |
| 6,310,962 B1 | 10/2001 | Chung et al. |
| 6,320,325 B1 | 11/2001 | Cok et al. |
| 6,323,631 B1 | 11/2001 | Juang |
| 6,356,029 B1 | 3/2002 | Hunter |
| 6,373,454 B1 | 4/2002 | Knapp et al. |
| 6,392,617 B1 | 5/2002 | Gleason |
| 6,414,661 B1 | 7/2002 | Shen et al. |
| 6,417,825 B1 | 7/2002 | Stewart et al. |
| 6,433,488 B1 | 8/2002 | Bu |
| 6,437,106 B1 | 8/2002 | Stoner et al. |
| 6,445,369 B1 | 9/2002 | Yang et al. |
| 6,475,845 B2 | 11/2002 | Kimura |
| 6,501,098 B2 | 12/2002 | Yamazaki |
| 6,501,466 B1 | 12/2002 | Yamagishi et al. |
| 6,522,315 B2 | 2/2003 | Ozawa et al. |
| 6,525,683 B1 | 2/2003 | Gu |
| 6,531,827 B2 | 3/2003 | Kawashima |
| 6,542,138 B1 | 4/2003 | Shannon et al. |
| 6,580,408 B1 | 6/2003 | Bae et al. |
| 6,580,657 B2 | 6/2003 | Sanford et al. |
| 6,583,398 B2 | 6/2003 | Harkin |
| 6,583,775 B1 | 6/2003 | Sekiya et al. |
| 6,594,606 B2 | 7/2003 | Everitt |
| 6,618,030 B2 | 9/2003 | Kane et al. |
| 6,639,244 B1 | 10/2003 | Yamazaki et al. |
| 6,668,645 B1 | 12/2003 | Gilmour et al. |
| 6,677,713 B1 | 1/2004 | Sung |
| 6,680,580 B1 | 1/2004 | Sung |
| 6,687,266 B1 | 2/2004 | Ma et al. |
| 6,690,000 B1 | 2/2004 | Muramatsu et al. |
| 6,690,344 B1 | 2/2004 | Takeuchi et al. |
| 6,693,388 B2 | 2/2004 | Oomura |
| 6,693,610 B2 | 2/2004 | Shannon et al. |
| 6,697,057 B2 | 2/2004 | Koyama et al. |
| 6,720,942 B2 | 4/2004 | Lee et al. |
| 6,724,151 B2 | 4/2004 | Yoo |
| 6,734,636 B2 | 5/2004 | Sanford et al. |
| 6,738,034 B2 | 5/2004 | Kaneko et al. |
| 6,738,035 B1 | 5/2004 | Fan |
| 6,753,655 B2 | 6/2004 | Shih et al. |
| 6,753,834 B2 | 6/2004 | Mikami et al. |
| 6,756,741 B2 | 6/2004 | Li |
| 6,756,952 B1 | 6/2004 | Decaux et al. |
| 6,756,985 B1 | 6/2004 | Hirotsune et al. |
| 6,771,028 B1 | 8/2004 | Winters |
| 6,777,712 B2 | 8/2004 | Sanford et al. |
| 6,777,888 B2 | 8/2004 | Kondo |
| 6,781,567 B2 | 8/2004 | Kimura |
| 6,806,497 B2 | 10/2004 | Jo |
| 6,806,638 B2 | 10/2004 | Lin et al. |
| 6,806,857 B2 | 10/2004 | Sempel et al. |
| 6,809,706 B2 | 10/2004 | Shimoda |
| 6,815,975 B2 | 11/2004 | Nara et al. |
| 6,828,950 B2 | 12/2004 | Koyama |
| 6,853,371 B2 | 2/2005 | Miyajima et al. |
| 6,859,193 B1 | 2/2005 | Yumoto |
| 6,873,117 B2 | 3/2005 | Ishizuka |
| 6,876,346 B2 | 4/2005 | Anzai et al. |
| 6,885,356 B2 | 4/2005 | Hashimoto |
| 6,900,485 B2 | 5/2005 | Lee |
| 6,903,734 B2 | 6/2005 | Eu |
| 6,909,243 B2 | 6/2005 | Inukai |
| 6,909,419 B2 | 6/2005 | Zavracky et al. |
| 6,911,960 B1 | 6/2005 | Yokoyama |
| 6,911,964 B2 | 6/2005 | Lee et al. |
| 6,914,448 B2 | 7/2005 | Jinno |
| 6,919,871 B2 | 7/2005 | Kwon |
| 6,924,602 B2 | 8/2005 | Komiya |
| 6,937,215 B2 | 8/2005 | Lo |
| 6,937,220 B2 | 8/2005 | Kitaura et al. |
| 6,940,214 B1 | 9/2005 | Komiya et al. |
| 6,943,500 B2 | 9/2005 | LeChevalier |
| 6,947,022 B2 | 9/2005 | McCartney |
| 6,954,194 B2 | 10/2005 | Matsumoto et al. |
| 6,956,547 B2 | 10/2005 | Bae et al. |
| 6,975,142 B2 | 12/2005 | Azami et al. |
| 6,975,332 B2 | 12/2005 | Arnold et al. |
| 6,995,510 B2 | 2/2006 | Murakami et al. |
| 6,995,519 B2 | 2/2006 | Arnold et al. |
| 7,023,408 B2 | 4/2006 | Chen et al. |
| 7,027,015 B2 | 4/2006 | Booth, Jr. et al. |
| 7,027,078 B2 | 4/2006 | Reihl |
| 7,034,793 B2 | 4/2006 | Sekiya et al. |
| 7,038,392 B2 | 5/2006 | Libsch et al. |
| 7,057,359 B2 | 6/2006 | Hung et al. |
| 7,061,451 B2 | 6/2006 | Kimura |
| 7,064,733 B2 * | 6/2006 | Cok et al. .................. 345/76 |
| 7,071,932 B2 | 7/2006 | Libsch et al. |
| 7,088,051 B1 | 8/2006 | Cok |
| 7,088,052 B2 | 8/2006 | Kimura |
| 7,102,378 B2 | 9/2006 | Kuo et al. |
| 7,106,285 B2 | 9/2006 | Naugler |
| 7,112,820 B2 | 9/2006 | Change et al. |
| 7,116,058 B2 | 10/2006 | Lo et al. |
| 7,119,493 B2 | 10/2006 | Fryer et al. |
| 7,122,835 B1 | 10/2006 | Ikeda et al. |
| 7,127,380 B1 | 10/2006 | Iverson et al. |
| 7,129,914 B2 | 10/2006 | Knapp et al. |

(56) References Cited

U.S. PATENT DOCUMENTS

| | | | |
|---|---|---|---|
| 7,164,417 B2 | 1/2007 | Cok | |
| 7,193,589 B2 | 3/2007 | Yoshida et al. | |
| 7,224,332 B2 | 5/2007 | Cok | |
| 7,227,519 B1 | 6/2007 | Kawase et al. | |
| 7,245,277 B2 | 7/2007 | Ishizuka | |
| 7,248,236 B2 | 7/2007 | Nathan et al. | |
| 7,262,753 B2 * | 8/2007 | Tanghe et al. | 345/82 |
| 7,274,363 B2 | 9/2007 | Ishizuka et al. | |
| 7,310,092 B2 | 12/2007 | Imamura | |
| 7,315,295 B2 | 1/2008 | Kimura | |
| 7,321,348 B2 | 1/2008 | Cok et al. | |
| 7,339,560 B2 | 3/2008 | Sun | |
| 7,355,574 B1 | 4/2008 | Leon et al. | |
| 7,358,941 B2 | 4/2008 | Ono et al. | |
| 7,368,868 B2 | 5/2008 | Sakamoto | |
| 7,411,571 B2 | 8/2008 | Huh | |
| 7,414,600 B2 | 8/2008 | Nathan et al. | |
| 7,423,617 B2 | 9/2008 | Giraldo et al. | |
| 7,474,285 B2 | 1/2009 | Kimura | |
| 7,502,000 B2 | 3/2009 | Yuki et al. | |
| 7,528,812 B2 | 5/2009 | Tsuge et al. | |
| 7,535,449 B2 | 5/2009 | Miyazawa | |
| 7,554,512 B2 | 6/2009 | Steer | |
| 7,569,849 B2 | 8/2009 | Nathan et al. | |
| 7,576,718 B2 | 8/2009 | Miyazawa | |
| 7,580,012 B2 | 8/2009 | Kim et al. | |
| 7,589,707 B2 | 9/2009 | Chou | |
| 7,609,239 B2 | 10/2009 | Chang | |
| 7,619,594 B2 | 11/2009 | Hu | |
| 7,619,597 B2 | 11/2009 | Nathan et al. | |
| 7,633,470 B2 | 12/2009 | Kane | |
| 7,656,370 B2 | 2/2010 | Schneider et al. | |
| 7,800,558 B2 | 9/2010 | Routley et al. | |
| 7,847,764 B2 * | 12/2010 | Cok et al. | 345/77 |
| 7,859,492 B2 | 12/2010 | Kohno | |
| 7,868,859 B2 | 1/2011 | Tomida et al. | |
| 7,876,294 B2 | 1/2011 | Sasaki et al. | |
| 7,924,249 B2 | 4/2011 | Nathan et al. | |
| 7,932,883 B2 * | 4/2011 | Klompenhouwer et al. | 345/88 |
| 7,969,390 B2 | 6/2011 | Yoshida | |
| 7,978,187 B2 | 7/2011 | Nathan et al. | |
| 7,994,712 B2 | 8/2011 | Sung et al. | |
| 8,026,876 B2 | 9/2011 | Nathan et al. | |
| 8,049,420 B2 | 11/2011 | Tamura et al. | |
| 8,077,123 B2 * | 12/2011 | Naugler, Jr. | 345/76 |
| 8,115,707 B2 | 2/2012 | Nathan et al. | |
| 8,223,177 B2 | 7/2012 | Nathan et al. | |
| 8,232,939 B2 | 7/2012 | Nathan et al. | |
| 8,259,044 B2 | 9/2012 | Nathan et al. | |
| 8,264,431 B2 | 9/2012 | Bulovic et al. | |
| 8,279,143 B2 | 10/2012 | Nathan et al. | |
| 8,339,386 B2 | 12/2012 | Leon et al. | |
| 2001/0002703 A1 | 6/2001 | Koyama | |
| 2001/0009283 A1 | 7/2001 | Arao et al. | |
| 2001/0024181 A1 | 9/2001 | Kubota | |
| 2001/0024186 A1 | 9/2001 | Kane et al. | |
| 2001/0026257 A1 | 10/2001 | Kimura | |
| 2001/0030323 A1 | 10/2001 | Ikeda | |
| 2001/0040541 A1 | 11/2001 | Yoneda et al. | |
| 2001/0043173 A1 | 11/2001 | Troutman | |
| 2001/0045929 A1 | 11/2001 | Prache | |
| 2001/0052606 A1 | 12/2001 | Sempel et al. | |
| 2001/0052940 A1 | 12/2001 | Hagihara et al. | |
| 2002/0000576 A1 | 1/2002 | Inukai | |
| 2002/0011796 A1 | 1/2002 | Koyama | |
| 2002/0011799 A1 | 1/2002 | Kimura | |
| 2002/0012057 A1 | 1/2002 | Kimura | |
| 2002/0014851 A1 | 2/2002 | Tai et al. | |
| 2002/0018034 A1 | 2/2002 | Ohki et al. | |
| 2002/0030190 A1 | 3/2002 | Ohtani et al. | |
| 2002/0047565 A1 | 4/2002 | Nara et al. | |
| 2002/0052086 A1 | 5/2002 | Maeda | |
| 2002/0067134 A1 | 6/2002 | Kawashima | |
| 2002/0084463 A1 | 7/2002 | Sanford et al. | |
| 2002/0101172 A1 | 8/2002 | Bu | |
| 2002/0105279 A1 | 8/2002 | Kimura | |
| 2002/0117722 A1 | 8/2002 | Osada et al. | |
| 2002/0122308 A1 | 9/2002 | Ikeda | |
| 2002/0158587 A1 | 10/2002 | Komiya | |
| 2002/0158666 A1 | 10/2002 | Azami et al. | |
| 2002/0158823 A1 | 10/2002 | Zavracky et al. | |
| 2002/0167474 A1 | 11/2002 | Everitt | |
| 2002/0180369 A1 | 12/2002 | Koyama | |
| 2002/0180721 A1 | 12/2002 | Kimura et al. | |
| 2002/0186214 A1 | 12/2002 | Siwinski | |
| 2002/0190924 A1 | 12/2002 | Asano et al. | |
| 2002/0190971 A1 | 12/2002 | Nakamura et al. | |
| 2002/0195967 A1 | 12/2002 | Kim et al. | |
| 2002/0195968 A1 | 12/2002 | Sanford et al. | |
| 2003/0020413 A1 | 1/2003 | Oomura | |
| 2003/0030603 A1 | 2/2003 | Shimoda | |
| 2003/0043088 A1 * | 3/2003 | Booth et al. | 345/45 |
| 2003/0057895 A1 | 3/2003 | Kimura | |
| 2003/0058226 A1 | 3/2003 | Bertram et al. | |
| 2003/0062524 A1 | 4/2003 | Kimura | |
| 2003/0063081 A1 | 4/2003 | Kimura et al. | |
| 2003/0071821 A1 | 4/2003 | Sundahl et al. | |
| 2003/0076048 A1 | 4/2003 | Rutherford | |
| 2003/0090447 A1 | 5/2003 | Kimura | |
| 2003/0090481 A1 | 5/2003 | Kimura | |
| 2003/0107560 A1 | 6/2003 | Yumoto et al. | |
| 2003/0111966 A1 | 6/2003 | Mikami et al. | |
| 2003/0122745 A1 | 7/2003 | Miyazawa | |
| 2003/0122813 A1 | 7/2003 | Ishizuki et al. | |
| 2003/0142088 A1 | 7/2003 | LeChevalier | |
| 2003/0151569 A1 | 8/2003 | Lee et al. | |
| 2003/0156101 A1 | 8/2003 | Le Chevalier | |
| 2003/0174152 A1 | 9/2003 | Noguchi | |
| 2003/0179626 A1 | 9/2003 | Sanford et al. | |
| 2003/0197663 A1 | 10/2003 | Lee et al. | |
| 2003/0210256 A1 | 11/2003 | Mori et al. | |
| 2003/0230141 A1 | 12/2003 | Gilmour et al. | |
| 2003/0230980 A1 | 12/2003 | Forrest et al. | |
| 2003/0231148 A1 | 12/2003 | Lin et al. | |
| 2004/0032382 A1 | 2/2004 | Cok et al. | |
| 2004/0066357 A1 | 4/2004 | Kawasaki | |
| 2004/0070557 A1 | 4/2004 | Asano et al. | |
| 2004/0070565 A1 | 4/2004 | Nayar et al. | |
| 2004/0090186 A1 | 5/2004 | Yoshida et al. | |
| 2004/0090400 A1 | 5/2004 | Yoo | |
| 2004/0095297 A1 | 5/2004 | Libsch et al. | |
| 2004/0100427 A1 | 5/2004 | Miyazawa | |
| 2004/0108518 A1 | 6/2004 | Jo | |
| 2004/0135749 A1 | 7/2004 | Kondakov et al. | |
| 2004/0145547 A1 | 7/2004 | Oh | |
| 2004/0150592 A1 | 8/2004 | Mizukoshi et al. | |
| 2004/0150594 A1 | 8/2004 | Koyama et al. | |
| 2004/0150595 A1 | 8/2004 | Kasai | |
| 2004/0155841 A1 | 8/2004 | Kasai | |
| 2004/0174347 A1 | 9/2004 | Sun et al. | |
| 2004/0174354 A1 | 9/2004 | Ono et al. | |
| 2004/0178743 A1 * | 9/2004 | Miller et al. | 315/169.3 |
| 2004/0183759 A1 | 9/2004 | Stevenson et al. | |
| 2004/0196275 A1 | 10/2004 | Hattori | |
| 2004/0207615 A1 | 10/2004 | Yumoto | |
| 2004/0239596 A1 | 12/2004 | Ono et al. | |
| 2004/0252089 A1 | 12/2004 | Ono et al. | |
| 2004/0257313 A1 | 12/2004 | Kawashima et al. | |
| 2004/0257353 A1 | 12/2004 | Imamura et al. | |
| 2004/0257355 A1 | 12/2004 | Naugler | |
| 2004/0263437 A1 | 12/2004 | Hattori | |
| 2004/0263444 A1 | 12/2004 | Kimura | |
| 2004/0263445 A1 | 12/2004 | Inukai et al. | |
| 2004/0263541 A1 | 12/2004 | Takeuchi et al. | |
| 2005/0007355 A1 | 1/2005 | Miura | |
| 2005/0007357 A1 | 1/2005 | Yamashita et al. | |
| 2005/0017650 A1 | 1/2005 | Fryer et al. | |
| 2005/0024081 A1 | 2/2005 | Kuo et al. | |
| 2005/0024393 A1 | 2/2005 | Kondo et al. | |
| 2005/0030267 A1 | 2/2005 | Tanghe et al. | |
| 2005/0057484 A1 * | 3/2005 | Diefenbaugh et al. | 345/102 |
| 2005/0057580 A1 | 3/2005 | Yamano et al. | |
| 2005/0067970 A1 | 3/2005 | Libsch et al. | |
| 2005/0067971 A1 | 3/2005 | Kane | |

(56) References Cited

U.S. PATENT DOCUMENTS

| | | |
|---|---|---|
| 2005/0068270 A1 | 3/2005 | Awakura et al. |
| 2005/0068275 A1 | 3/2005 | Kane |
| 2005/0073264 A1 | 4/2005 | Matsumoto |
| 2005/0083323 A1 | 4/2005 | Suzuki et al. |
| 2005/0088103 A1 | 4/2005 | Kageyama et al. |
| 2005/0110420 A1* | 5/2005 | Arnold et al. ............ 315/169.3 |
| 2005/0110807 A1 | 5/2005 | Chang |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0179626 A1 | 8/2005 | Yuki et al. |
| 2005/0179628 A1 | 8/2005 | Kimura |
| 2005/0185200 A1 | 8/2005 | Tobol |
| 2005/0200575 A1 | 9/2005 | Kim et al. |
| 2005/0206590 A1 | 9/2005 | Sasaki et al. |
| 2005/0219184 A1 | 10/2005 | Zehner et al. |
| 2005/0248515 A1 | 11/2005 | Naugler et al. |
| 2005/0269959 A1 | 12/2005 | Uchino et al. |
| 2005/0269960 A1 | 12/2005 | Ono et al. |
| 2005/0280615 A1 | 12/2005 | Cok et al. |
| 2005/0280766 A1 | 12/2005 | Johnson et al. |
| 2005/0285822 A1 | 12/2005 | Reddy et al. |
| 2005/0285825 A1 | 12/2005 | Eom et al. |
| 2006/0001613 A1 | 1/2006 | Routley et al. |
| 2006/0007072 A1 | 1/2006 | Choi et al. |
| 2006/0012310 A1 | 1/2006 | Chen et al. |
| 2006/0012311 A1 | 1/2006 | Ogawa |
| 2006/0027807 A1 | 2/2006 | Nathan et al. |
| 2006/0030084 A1 | 2/2006 | Young |
| 2006/0038758 A1 | 2/2006 | Routley et al. |
| 2006/0038762 A1 | 2/2006 | Chou |
| 2006/0066533 A1 | 3/2006 | Sato et al. |
| 2006/0077135 A1 | 4/2006 | Cok et al. |
| 2006/0082523 A1 | 4/2006 | Guo et al. |
| 2006/0092185 A1 | 5/2006 | Jo et al. |
| 2006/0097628 A1 | 5/2006 | Suh et al. |
| 2006/0097631 A1 | 5/2006 | Lee |
| 2006/0103611 A1 | 5/2006 | Choi |
| 2006/0149493 A1 | 7/2006 | Sambandan et al. |
| 2006/0170623 A1 | 8/2006 | Naugler, Jr. et al. |
| 2006/0176250 A1 | 8/2006 | Nathan et al. |
| 2006/0208961 A1 | 9/2006 | Nathan et al. |
| 2006/0232522 A1 | 10/2006 | Roy et al. |
| 2006/0244697 A1 | 11/2006 | Lee et al. |
| 2006/0261841 A1 | 11/2006 | Fish |
| 2006/0273997 A1 | 12/2006 | Nathan et al. |
| 2006/0284801 A1 | 12/2006 | Yoon et al. |
| 2006/0284895 A1 | 12/2006 | Marcu et al. |
| 2006/0290618 A1 | 12/2006 | Goto |
| 2007/0001937 A1 | 1/2007 | Park et al. |
| 2007/0001939 A1 | 1/2007 | Hashimoto et al. |
| 2007/0008268 A1 | 1/2007 | Park et al. |
| 2007/0008297 A1 | 1/2007 | Bassetti |
| 2007/0057873 A1 | 3/2007 | Uchino et al. |
| 2007/0069998 A1 | 3/2007 | Naugler et al. |
| 2007/0075727 A1 | 4/2007 | Nakano et al. |
| 2007/0076226 A1 | 4/2007 | Klompenhouwer et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0097038 A1 | 5/2007 | Yamazaki et al. |
| 2007/0097041 A1 | 5/2007 | Park et al. |
| 2007/0103419 A1 | 5/2007 | Uchino et al. |
| 2007/0115221 A1* | 5/2007 | Buchhauser et al. ............ 345/76 |
| 2007/0164664 A1* | 7/2007 | Ludwicki et al. ............ 313/504 |
| 2007/0182671 A1 | 8/2007 | Nathan et al. |
| 2007/0236517 A1 | 10/2007 | Kimpe |
| 2007/0241999 A1 | 10/2007 | Lin |
| 2007/0273294 A1 | 11/2007 | Nagayama |
| 2007/0285359 A1 | 12/2007 | Ono |
| 2007/0290958 A1 | 12/2007 | Cok |
| 2007/0296672 A1 | 12/2007 | Kim et al. |
| 2008/0001525 A1 | 1/2008 | Chao et al. |
| 2008/0001544 A1 | 1/2008 | Murakami et al. |
| 2008/0030518 A1* | 2/2008 | Higgins et al. ............ 345/589 |
| 2008/0036708 A1 | 2/2008 | Shirasaki |
| 2008/0042942 A1 | 2/2008 | Takahashi |
| 2008/0042948 A1 | 2/2008 | Yamashita et al. |
| 2008/0048951 A1 | 2/2008 | Naugler, Jr. et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0088648 A1 | 4/2008 | Nathan et al. |
| 2008/0117144 A1 | 5/2008 | Nakano et al. |
| 2008/0150847 A1 | 6/2008 | Kim et al. |
| 2008/0158115 A1* | 7/2008 | Cordes et al. ............ 345/82 |
| 2008/0231558 A1 | 9/2008 | Naugler |
| 2008/0231562 A1 | 9/2008 | Kwon |
| 2008/0252571 A1 | 10/2008 | Hente et al. |
| 2008/0259020 A1* | 10/2008 | Fisekovic et al. ............ 345/102 |
| 2008/0290805 A1 | 11/2008 | Yamada et al. |
| 2008/0297055 A1 | 12/2008 | Miyake et al. |
| 2009/0058772 A1 | 3/2009 | Lee |
| 2009/0160743 A1 | 6/2009 | Tomida et al. |
| 2009/0174628 A1 | 7/2009 | Wang et al. |
| 2009/0184901 A1 | 7/2009 | Kwon |
| 2009/0195483 A1 | 8/2009 | Naugler, Jr. et al. |
| 2009/0201281 A1 | 8/2009 | Routley et al. |
| 2009/0213046 A1 | 8/2009 | Nam |
| 2010/0004891 A1 | 1/2010 | Ahlers et al. |
| 2010/0026725 A1 | 2/2010 | Smith |
| 2010/0039422 A1 | 2/2010 | Seto |
| 2010/0060911 A1 | 3/2010 | Marcu et al. |
| 2010/0165002 A1 | 7/2010 | Ahn |
| 2010/0194670 A1 | 8/2010 | Cok |
| 2010/0207960 A1 | 8/2010 | Kimpe et al. |
| 2010/0277400 A1 | 11/2010 | Jeong |
| 2010/0315319 A1 | 12/2010 | Cok et al. |
| 2011/0069051 A1 | 3/2011 | Nakamura et al. |
| 2011/0069089 A1 | 3/2011 | Kopf et al. |
| 2011/0074750 A1* | 3/2011 | Leon et al. ............ 345/207 |
| 2011/0149166 A1* | 6/2011 | Botzas et al. ............ 348/649 |
| 2011/0227964 A1 | 9/2011 | Chaji et al. |
| 2011/0273399 A1 | 11/2011 | Lee |
| 2011/0293480 A1 | 12/2011 | Mueller |
| 2012/0056558 A1 | 3/2012 | Toshiya et al. |
| 2012/0062565 A1 | 3/2012 | Fuchs et al. |
| 2012/0299978 A1 | 11/2012 | Chaji |
| 2013/0027381 A1 | 1/2013 | Nathan et al. |
| 2013/0057595 A1 | 3/2013 | Nathan et al. |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 438 577 | 8/2002 |
| CA | 2 463 653 | 1/2004 |
| CA | 2 498 136 | 3/2004 |
| CA | 2 522 396 | 11/2004 |
| CA | 2 443 206 | 3/2005 |
| CA | 2 472 671 | 12/2005 |
| CA | 2 567 076 | 1/2006 |
| CA | 2 526 782 | 4/2006 |
| CA | 2 550 102 | 4/2008 |
| CN | 1381032 | 11/2002 |
| CN | 1448908 | 10/2003 |
| CN | 1760945 | 4/2006 |
| EP | 0 158 366 | 10/1985 |
| EP | 1 028 471 | 8/2000 |
| EP | 1 111 577 | 6/2001 |
| EP | 1 130 565 A1 | 9/2001 |
| EP | 1 194 013 | 4/2002 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 465 143 A | 10/2004 |

(56) References Cited

FOREIGN PATENT DOCUMENTS

| | | |
|---|---|---|
| EP | 1 469 448 A | 10/2004 |
| EP | 1 521 203 A2 | 4/2005 |
| EP | 1 594 347 | 11/2005 |
| EP | 1 784 055 A2 | 5/2007 |
| EP | 1854338 A1 | 11/2007 |
| EP | 1 879 169 A1 | 1/2008 |
| EP | 1 879 172 | 1/2008 |
| GB | 2 389 951 | 12/2003 |
| JP | 1272298 | 10/1989 |
| JP | 4-042619 | 2/1992 |
| JP | 6-314977 | 11/1994 |
| JP | 8-340243 | 12/1996 |
| JP | 09-090405 | 4/1997 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000-056847 | 2/2000 |
| JP | 2000-81607 | 3/2000 |
| JP | 2001-134217 | 5/2001 |
| JP | 2001-195014 | 7/2001 |
| JP | 2002-055654 | 2/2002 |
| JP | 2002-91376 | 3/2002 |
| JP | 2002-514320 | 5/2002 |
| JP | 2002-278513 | 9/2002 |
| JP | 2002-333862 | 11/2002 |
| JP | 2003-076331 | 3/2003 |
| JP | 2003-124519 | 4/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-145197 | 5/2004 |
| JP | 2004-287345 | 10/2004 |
| JP | 2005-057217 | 3/2005 |
| JP | 4-158570 | 10/2008 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 1221268 | 9/2004 |
| TW | 1223092 | 11/2004 |
| TW | 200727247 | 7/2007 |
| WO | WO 98/48403 | 10/1998 |
| WO | WO 99/48079 | 9/1999 |
| WO | WO 01/06484 | 1/2001 |
| WO | WO 01/27910 A1 | 4/2001 |
| WO | WO 01/63587 A2 | 8/2001 |
| WO | WO 02/067327 A | 8/2002 |
| WO | WO 03/001496 A1 | 1/2003 |
| WO | WO 03/034389 A | 4/2003 |
| WO | WO 03/058594 A1 | 7/2003 |
| WO | WO 03-063124 | 7/2003 |
| WO | WO 03/077231 | 9/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 | 8/2006 |
| WO | WO 2007/003877 A | 1/2007 |
| WO | WO 2007/079572 | 7/2007 |
| WO | WO 2007/120849 A2 | 10/2007 |
| WO | WO 2009/055920 | 5/2009 |
| WO | WO 2010/023270 | 3/2010 |
| WO | WO 2011/041224 A1 | 4/2011 |

OTHER PUBLICATIONS

Ahnood et al.: "Effect of threshold voltage instability on field effect mobility in thin film transistors deduced from constant current measurements"; dated Aug. 2009.

Alexander et al.: "Pixel circuits and drive schemes for glass and elastic AMOLED displays"; dated Jul. 2005 (9 pages).

Alexander et al.: "Unique Electrical Measurement Technology for Compensation, Inspection, and Process Diagnostics of AMOLED HDTV"; dated May 2010 (4 pages).

Arokia Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon Amoled Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "A Stable Voltage-Programmed Pixel Circuit for a-Si:H AMOLED Displays"; dated Dec. 2006 (12 pages).

Chaji et al.: "A Sub-µA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated May 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).

Chaji et al.: "Merged phototransistor pixel with enhanced near infra-red response and flicker noise reduction for biomolecular imaging"; dated Nov. 2008 (3 pages).

Chaji et al.: "Parallel Addressing Scheme for Voltage-Programmed Active-Matrix OLED Displays"; dated May 2007 (6 pages).

(56) References Cited

OTHER PUBLICATIONS

Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High- Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for EP Application No. EP 10 16 6143, dated Sep. 3, 2010 (2 pages).
International Search Report for PCT Application No. PCT/CA2009/001769, dated Apr. 8, 2010 (3 pages).
Jafarabadiashtiani et al.: "A New Driving Method for a-Si AMOLED Displays Based on Voltage Feedback"; dated 2005 (4 pages).
Joon-Chul Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
Lee et al.: "Ambipolar Thin-Film Transistors Fabricated by PECVD Nanocrystalline Silicon"; dated 2006 (6 pages).
Ma E Y et al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Nathan A. et al., "Thin Film imaging technology on glass and plastic" ICM 2000, proceedings of the 12 international conference on microelectronics, dated Oct. 31, 2001 (4 pages).
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)"; dated 2006 (4 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Stewart M. et al., "polysilicon TFT technology for active matrix oled displays" IEEE transactions on electron devices, vol. 48, No. 5, dated May 2001 (7 pages).
Vygranenko et al.: "Stability of indium—oxide thin-film transistors by reactive ion beam assisted deposition"; dated 2009.
Wang et al.: "Indium oxides by reactive ion beam assisted evaporation: From material study to device application"; dated Mar. 2009 (6 pages).

Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Spindler et al., System Considerations for RGBW OLED Displays, Journal of the SID 14/1, 2006, pp. 37-48.
European Search Report for European Application No. EP 11739485.8-1904 dated Aug. 6, 2013, (14 pages).
European Search Report for European Application No. EP 011122313 dated Sep. 14, 2005 (4 pages).
European Search Report for European Application No. EP 04786661 dated Mar. 9, 2009.
European Search Report for European Application No. EP 05759141 dated Oct. 30, 2009 (2 pages).
European Search Report for European Application No. EP 05819617 dated Jan. 30, 2009.
European Search Report for European Application No. EP 06 70 5133 dated Jul. 18, 2008.
European Search Report for European Application No. EP 06721798 dated Nov. 12, 2009 (2 pages).
European Search Report for European Application No. EP 07719579 dated May 20, 2009.
European Search Report for European Application No. EP 07815784 dated Jul. 20, 2010 (2 pages).
European Search Report for European Application No. EP 07710608.6 dated Mar. 19, 2010 (7 pages).
European Search Report, Application No. EP 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. EP 09733076.5 (13 pages).
Extended European Search Report mailed Jul. 11, 2012 which issued in corresponding European Patent Application No. EP 11191641.7 (14 pages).
Extended European Search Report mailed Nov. 29, 2012, issued in European Patent Application No. EP 11168677.0 (13 page).
Fossum, Eric R.. "Active Pixel Sensors: Are CCD's Dinosaurs?" SPIE: Symposium on Electronic Imaging. Feb. 1, 1993 (13 pages).
International Preliminary Report on Patentability for International Application No. PCT/CA2005/001007 dated Oct. 16, 2006, 4 pages.
International Search Report corresponding to International Application No. PCT/IB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA2005/001007 dated Oct. 18, 2005.
International Search Report for International Application No. PCT/CA2007/000652 dated Jul. 25, 2007.
European Search Report for European Application No. PCT/CA2006/000177 dated Jun. 2, 2006.
International Search Report for International Application No. PCT/CA2004/001741 dated Feb. 21, 2005.
International Search Report mailed Dec. 3, 2002, issued in International Patent Application No. PCT/JP02/09668 (4 pages).
International Search Report mailed Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2010/055481, dated Apr. 7, 2011, 3 pages.

(56) References Cited

OTHER PUBLICATIONS

International Searching Authority Search Report, PCT/IB2011/051103, dated Jul. 8, 2011, 3 pages.
International Searching Authority Written Opinion, PCT/IB2010/055481, dated Apr. 7, 2011, 6 pages.
International Searching Authority Written Opinion, PCT/IB2011/051103, dated Jul. 8, 2011, 6 pages.
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
International Written Opinion, PCT/IB2012/052372, mailed Sep. 12, 2012 (6 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee, Wonbok: "Thermal Management in Microprocessor Chips and Dynamic Backlight Control in Liquid Crystal Displays", Ph.D. Dissertation, University of Southern California (124 pages).
Mendes E., et al. "A High Resolution Switch-Current Memory Base Cell." IEEE: Circuits and Systems. vol. 2, Aug. 1999 (pp. 718-721).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report mailed Mar. 20, 2012 which issued in corresponding European Patent Application No. EP 11191641.7 (8 pages).
Partial European Search Report mailed Sep. 22, 2011 corresponding to European Patent Application No. EP 11168677.0 (5 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Yu, Jennifer: "Improve OLED Technology for Display", Ph.D. Dissertation, Massachusetts Institute of Technology, Sep. 2008 (151 pages).
Extended European Search Report mailed Aug. 6, 2013, issued in European Patent Application No. 11739485.8 (14 pages).
International Search Report corresponding to co-pending International Patent Application Serial No. PCT/IB2013/054251, Canadian Intellectual Property Office, dated Sep. 11, 2013; (4 pages).
International Written Opinion corresponding to co-pending International Patent Application Serial No. PCT/IB2013/054251, Canadian Intellectual Property Office, dated Sep. 11, 2013; (5 pages).
Singh, et al., "Current Conveyor: Novel Universal Active Block", Samriddhi, S-JPSET vol. I, Issue 1, 2010, pp. 41-48.

* cited by examiner

COMPENSATION TECHNIQUE FOR COLOR SHIFT IN DISPLAYS

CROSS-REFERENCE TO RELATED APPLICATIONS

This application claims priority to Canadian Application No. 2,669,367 which was filed Jun. 16, 2009.

FIELD OF THE INVENTION

This invention is directed generally to color displays that use light emissive devices such as OLEDs and, more particularly, to compensating for color shifts in such displays as the light emissive devices age.

BACKGROUND OF THE INVENTION

Previous compensation technique for OLED displays considered backplane aging and OLED efficiency lost. The aging (and/or uniformity) of the panel was extracted and stored in lookup tables as raw or processed data. Then a compensation block used the stored data to compensate for any shift in the electrical parameters of the backplane (e.g., threshold voltage shift) or the OLED (e.g., shift in the OLED operating voltage). Such techniques can be used to compensate for OLED efficiency losses as well. These techniques are based on the assumption that the OLED color coordinates are stable despite reductions in the OLED efficiency. Depending on the OLED material and the required device lifetime, this can be a valid assumption. However, for OLED materials with low stability in color coordinates, this can result in excessive display color shifts and image sticking issues.

The color coordinates (i.e., chromaticity) of an OLED shift over time. These shifts are more pronounced in white OLEDs since the different color components that are combined in an OLED structure used to create white light can shift differently (e.g., the blue portion may age faster than the red or green portion of the combined OLED stack), leading to undesirable shifts in the display white point, which in turn lead to artifacts such as image sticking. Moreover, this phenomenon is applicable to other OLEDs as well, such as OLEds that consist of only single color components in a stack (i.e., single Red OLED stack, single GREEN OLED stack, etc.). As a result, color shifts that occur in the display can cause severe image sticking issues.

SUMMARY

Additional aspects of the invention will be apparent to those of ordinary skill in the art in view of the detailed description of various embodiments, which is made with reference to the drawings, a brief description of which is provided below.

In accordance with one embodiment, a system is provided for maintaining a substantially constant display white point over an extended period of operation of a color display formed by an array of multiple pixels in which each of the pixels includes multiple subpixels having different colors, and each of the subpixels includes a light emissive device. The display is generated by energizing the subpixels of successively selected pixels, and the color of each selected pixel is controlled by the relatives levels of energization of the subpixels in the selected pixel. The degradation behavior of the subpixels in each pixel is determined, and the relative levels of energization of the subpixels in each pixel are adjusted to adjust the brightness shares of the subpixels to compensate for the degradation behavior of the subpixels. The brightness shares are preferably adjusted to maintain a substantially constant display white point.

In one implementation, the light emissive devices are OLEDs, and the degradation behavior used is a shift in the chromaticity coordinates of the subpixels of a selected pixel, such as a white pixel in an RGBW display. The voltage at a current input to each OLED is measured and used in the determining the shift in the chromaticity coordinates.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
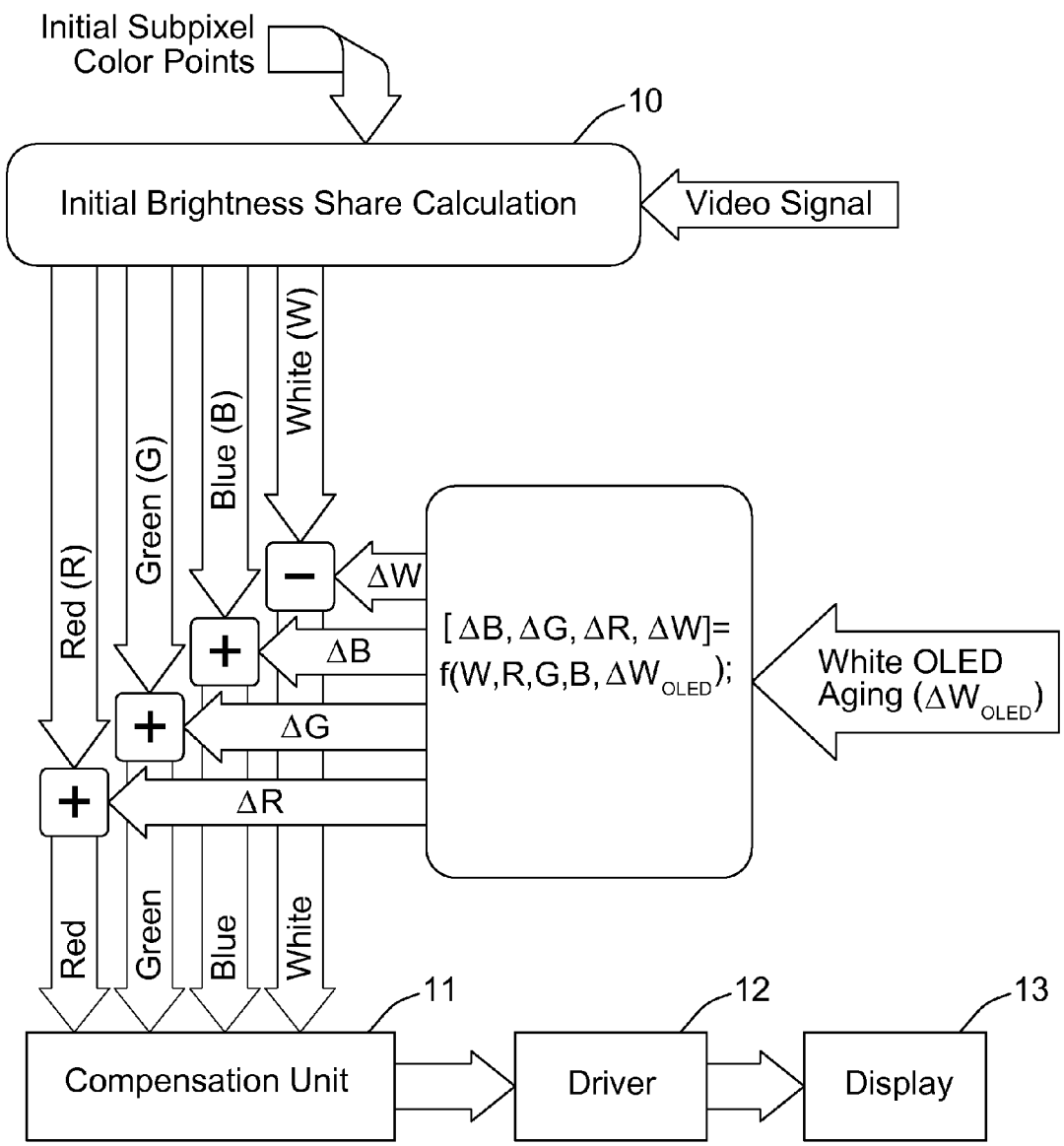
FIG. 1 is a functional block diagram of system for compensating for color shifts in the pixels of a color display using OLEDs.

FIG. 1 illustrates a system in which the brightness of each subpixel is adjusted, based on the aging of at latest one of the subpixels in each pixel, to maintain a substantially constant display white point over time, such as the operating life of a display, e.g., 75,000 hours. For example, in an RGBW display, if the white OLED in a pixel loses part of its blue color component, thus producing a warmer white than desired, the blue OLED in that same pixel may be turned on along with the white OLED in that same pixel, during a white display. Similarly, in an RGB display, the brightness shares of the red, green and blue OLEDs may be dynamically adjusted over time in response to each OLED's degradation behavior, to keep the white point of the display substantially constant. In either case, the amount of change required in the brightness of each subpixel can be extracted from the shift in the color coordinates of one or more of the subpixels. This can be implemented by a series of calculations or by use of a look-up table containing pre-calculated values, to determine the correlation between shifts in the voltage or current supplied to a subpixel and/or the brightness of the light-emitting material in that subpixel.

Fixed initial color points of the subpixels may be used to calculate the brightness shares of the subpixels in each subpixel. Then during operation of the display, a correction unit determines a correction factor for each subpixel, e.g., by use of a lookup table. In FIG. 1, the initial subpixel color points and the video input signal for the display are supplied to an initial brightness share calculation unit 10, which determines the brightness shares for the red, green blue and white subpixels. These brightness shares are then adjusted by respective values ΔR, ΔG, ΔB and ΔW derived from a signal $\Delta W_{OLED}$ that represents the aging of the white subpixel. The adjusted brightness shares are sent to a compensation unit 11, which adjusts the video signal according to the adjusted brightness shares and sends the adjusted video signals to a driver 12 coupled to an OLED display 13. The driver 12 generates the signals that energize the various subpixels in the display 13 to produce the desired luminance from each subpixel.

Figure 2:
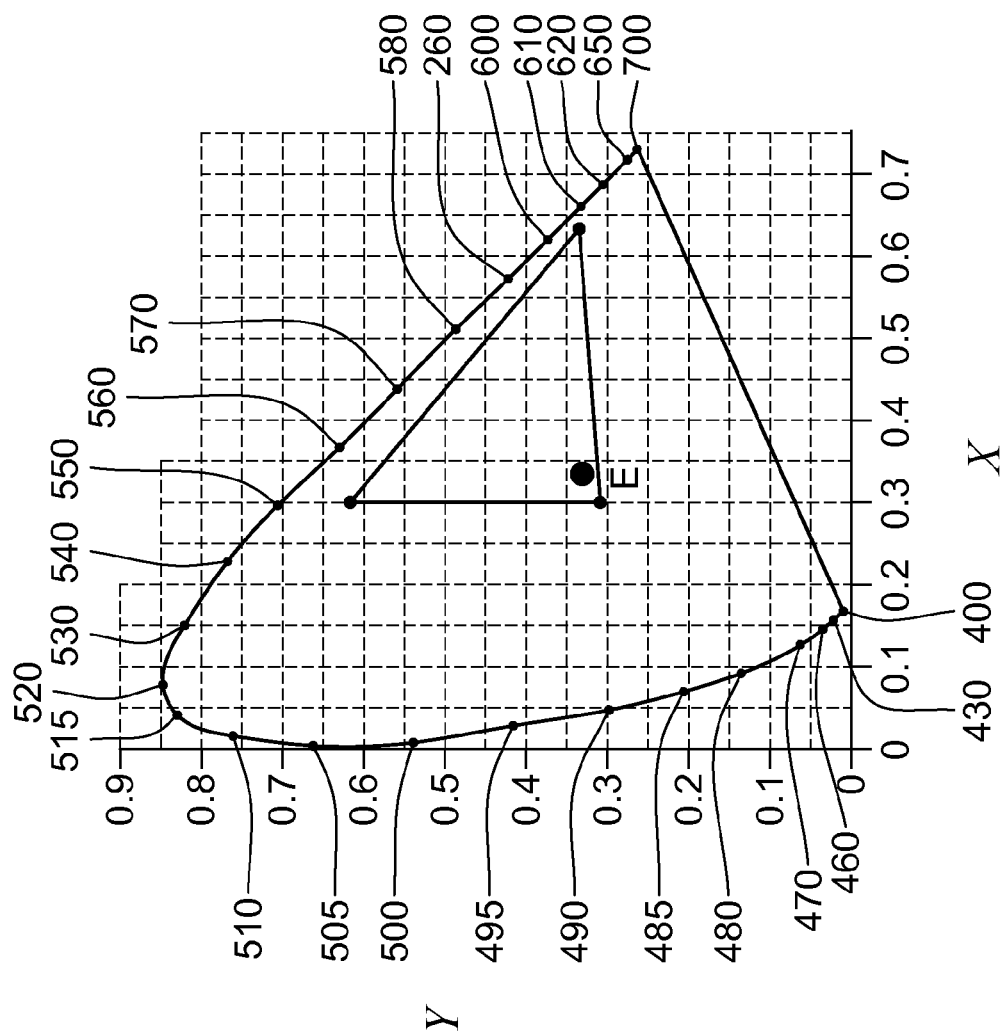
FIG. 2 is a CIE chromaticity diagram.

Different standards exist for characterizing colors. One example is the 1931 CIE standard, which characterizes colors by a luminance (brightness) parameter and two color coordinates x and y. The coordinates x and y specify a point on a CIE chromataciaty diagram, as illustrated in FIG. 2, which represents the mapping of human color perception in terms of the two CIE parameters x and y. The colors that can be matched by combining a given set of three primary colors, such as red, green and blue, are represented in FIG. 2 by the triangle T that joins the coordinates for the three colors, within the CIE chromaticity diagram of FIG. 2.

Figure 3:
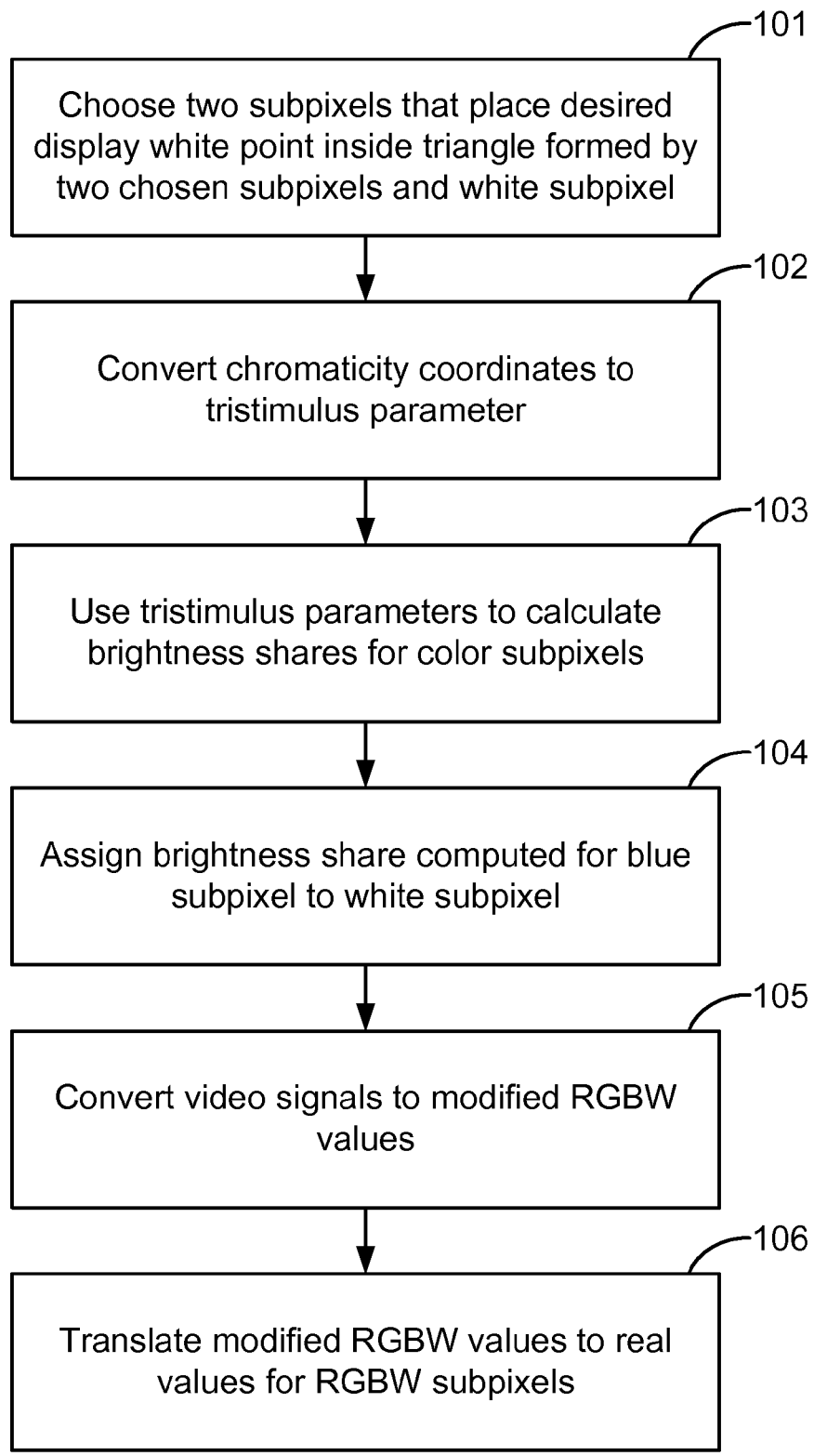
FIG. 3 is a flow chart of a procedure for compensating for color shifts in the system of FIG. 1.

FIG. 3 is a flow chart of a procedure for determining the brightness shares for the subpixels in an RGBW display from initial subpixel color points and the video input signal for the image to be displayed, which are the two inputs to the initial brightness share calculation unit 10 in FIG. 1. The procedure of FIG. 3 begins at step 101 by choosing two subpixels from the red, green and blue subpixels, such that the desired display white point is inside a triangle that can be formed with the color points of the two selected subpixels and the white subpixel. For example, the triangle T in FIG. 2 is defined by the red, green and white subpixel values from the following set of chromaticity coordinates of four RGBW subpixels and a display white point:

Blue subpixel=[0.154, 0.149]
Red subpixel=[0.67, 0.34]
Green subpixel=[0.29, 0.605]
White subpixel=[0.29, 0.31]
Display white point=[0.3138, 0.331]

It can be seen that the display white point falls inside the triangle T formed by connecting the chromaticity coordinates of the red, green and white subpixels.

After choosing two subpixels at step 101, it is assumed that the white subpixel is the third primary color, and then at step 102 the chromaticity coordinates of the red, green and blue subpixels (considering the blue and white subpixels to be the same at this stage) are converted to tristimulus parameters to facilitate calculation of the brightness shares of the red, green and blue subpixels to achieve the desired display white point. Any color on a CIE chromaticity diagram can be considered to be a mixture of three CIE primaries, which can be specified by three numbers X, Y and Z called tristimulus values. The tristimulus values X, Y and Z uniquely represent a perceivable hue, and different combinations of light wavelengths that give the same set of tristimulus values are indistinguishable to the human eye. Converting the chromaticity coordinates to tristimulus values permits the use of linear algebra to calculate a set of brightness shares for the red, green and blue subpixels to achieve the desired display white point.

Step 103 uses the tristimulus values to calculate the brightness shares for the red, green and blue subpixels to achieve the desired display white point. For the exemplary set of chromaticity coordinates and desired display white point set forth above, the brightness shares of the red, green and blue subpixels are $B_{RW}$=6.43%, $B_{GW}$=11.85% and $B_{WW}$=81.72%, respectively. The same calculation can be used to calculate the brightness shares $B_R$, $B_G$ and $B_B$ for the red, green and blue subpixels in an RGB display.

Step 104 assigns to the white subpixel the brightness share calculated for the blue subpixel, and these brightness shares will produce the desired display white point in an RGBW system. Video signals, however, are typically based on an RGB system, so step 105 converts the video signals $R_{rgb}$, $G_{rgb}$ and $B_{rgb}$ to modified RGBW values $W_m$, $R_m$, $G_m$ and $B_m$ by setting $W_m$ equal to the minimum of $R_{rgb}$, $G_{rgb}$ and $B_{rgb}$ and subtracting the white portion of the red, green and blue pixels from the values of the signals $R_{rgb}$, $G_{rgb}$ and $B_{rgb}$, as follows:

$W_m$=minimum of $R_{rgb}$, $G_{rgb}$ and $B_{rgb}$ $$R_m = R_{rgb} - W$$

$$G_m = G_{rgb} - W$$

$$B_m = B_{rgb} - W$$

Step 106 then uses the calculated brightness shares for $B_{RW}$, $B_{GW}$ and $B_{WW}$ to translate the modified values $W_m$, $R_m$, $G_m$, and $B_m$ to actual values W, R, G and B for the four RGBW subpixels, as follows:

$$W = W_m * B_{WW}$$

$$R = R_m + W_m * B_{RW}/B_R$$

$$G = G_m + W_m * B_{GW}/B_G$$

$$B = B_m + W_m * B_{BW}/B_B$$

The values W, G, R and B are the gray scales for the white, green, red and blue subpixels w, r, g, and b.

Figure 4A:
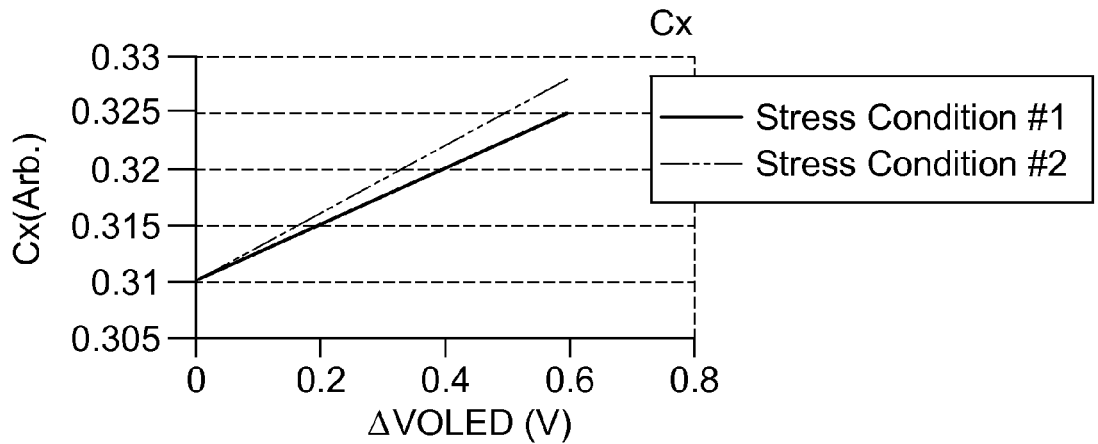
FIG. 4 is a pair of graphs representing variations in the chromaticity coordinates as a function of the OLED voltage for OLEDs subjected to two different stress conditions.
Figure 4B:
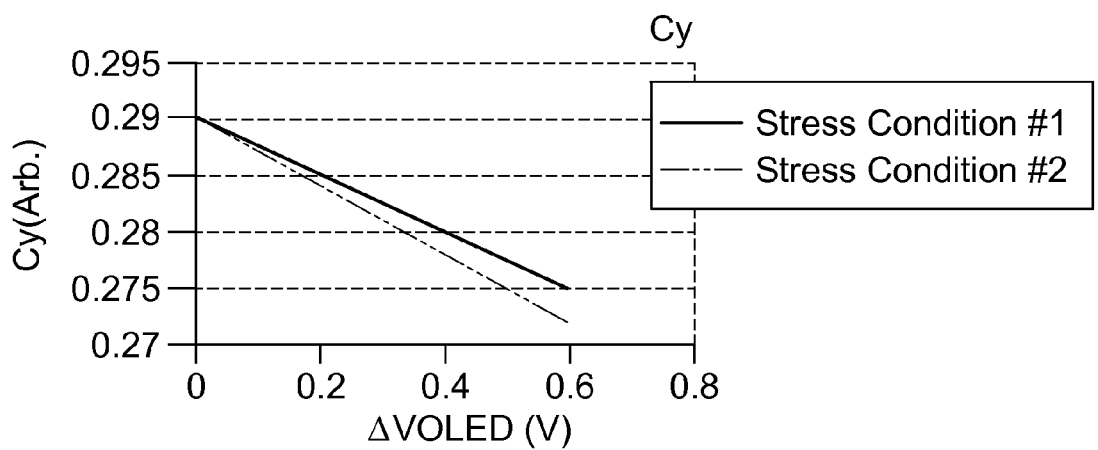

FIGS. 4A and 4B are graphs plotted from actual measurements of the brightness of two white OLEDs while being aged by passing constant currents through the OLEDs. The currents supplied to the two OLEDs were different, to simulate two different stress conditions #1 and #2, as indicated in FIGS. 4A and 4B. As the OLED material ages, the resistance of the OLED increases, and thus the voltage required to maintain a constant current through the OLED increases. For the curves of FIGS. 4A and 4B, the voltage applied to each aging OLED to maintain a constant current was measured at successive intervals and compared with the voltage measured across a non-aged reference OLED supplied with the same magnitude of current and subjected to the same ambient conditions as the aging OLED.

The numbers on the horizontal axes of FIGS. 4A and 4B represent ΔVOLED, which is the difference between the voltages measured for the aging OLED and the corresponding reference LED. The numbers on the vertical axes of FIGS. 4A and 4B represent the respective chromaticity coordinates Cx and Cy of the measured brightness values of the aging white OLEDs.

In order to compensate for the brightness degradation of a white subpixel as the white subpixel ages, the brightness shares of the red, green and blue subpixels can be to be adjusted to $B_{RW}$=7.62%, $B_{GW}$=8.92% and $B_{WW}$=83.46%, respectively, at ΔVOLED=0.2; to $B_{RW}$=8.82%, $B_{GW}$=5.95% and $B_{WW}$=85.23%, respectively, at ΔVOLED=0.4; and to $B_{RW}$=10.03%, $B_{GW}$=2.96% and $B_{WW}$=87.01%, respectively, at ΔVOLED=0.6. These adjustments in the brightness shares of the subpixels are used in the compensation unit 11 to provide compensated video signals to the driver 12 that drives successive sets of subpixels in the display 13.

Figure 6:
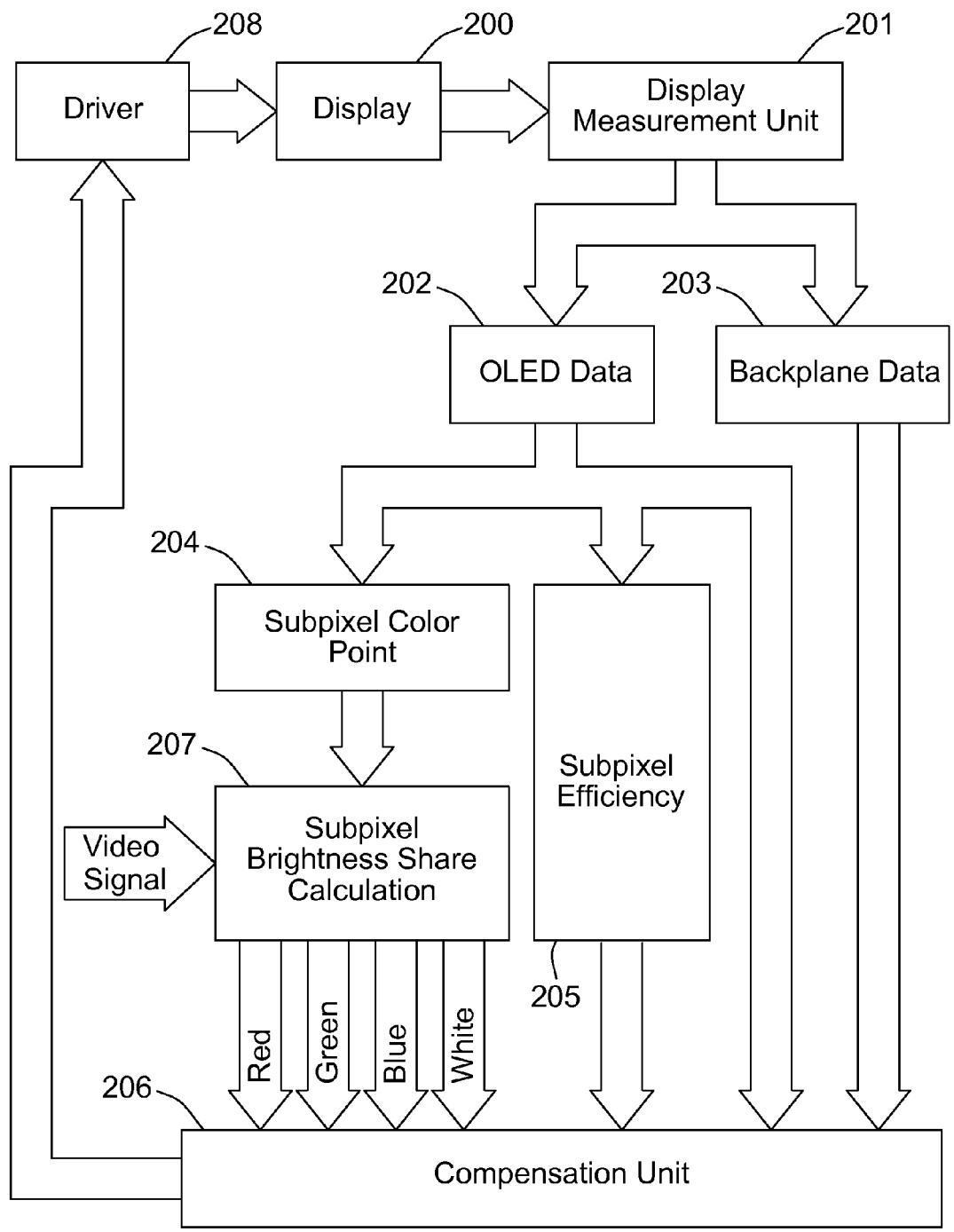
FIG. 6 is a functional block diagram of a modified system for compensating for color shifts in the pixels of a color display using OLEDs.

FIG. 6 illustrates a compensation system using OLED data extracted from a display 200 (in the form of either OLED voltage, OLED current, or OLED luminance) and corrects for color shifts. This system can be used for dynamic brightness share calculations in which the chromaticity coordinates of the subpixels do not remain fixed, but rather are adjusted from time to time to compensate for changes in the color point of each subpixel over time. These calculations can be done in advance and put into a lookup table.

FIG. 6 illustrates a system in which OLED data, such as OLED voltage, OLED current or OLED luminance, is extracted from an OLED display 200 and used to compensate for color shifts as the OLEDs age, to maintain a substantially constant display white point over time. A display measurement unit 201 measures both OLED data 202 and backplane data 203, and the backplane data 203 is sent to a compensation unit 206 for use in compensating for aging of backplane components such as drive transistors. The OLED data 202 is sent to a subpixel color point unit 204, a subpixel efficiency unit 205 and a compensation unit 206. The subpixel color point unit determines new color points for the individual subpixels based on the OLED data (e.g., by using a lookup table), and the new color points are sent to a subpixel brightness share calculation unit 207, which also receives the video input signal for the display. The brightness shares may be calculated in the same manner described above, and are then used in the compensation unit 206 to make compensating adjustments in the signals supplied to the four subpixels in each pixel. Lookup tables can be used for a simpler implementation, and lookup tables for the color points and the color shares can even be merged into a single lookup table.

To compensate for the optical aging of the individual subpixels, the gray scales may be adjusted using the following value $\Delta V_{CL\_W}$ as the compensating adjustment for the white pixels:

$$\Delta V_{CL\_W} = G_{mW}(W) * K_{CL\_W}$$

where $$G_{mW}(W) = \frac{d}{dv} I_{pixel_w}(W)$$

Figure 5:
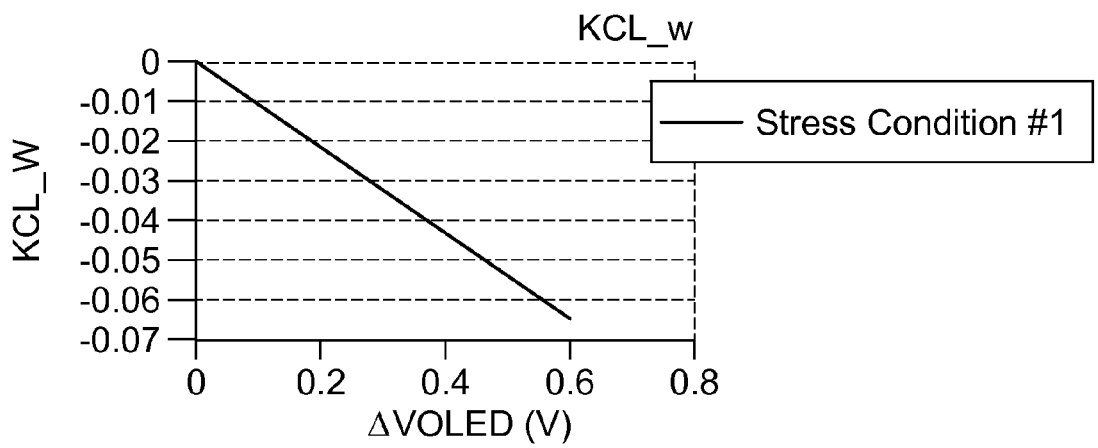
FIG. 5 is a graph representing variations in a brightness correction factor as a function of the OLED voltage a white OLED subjected to one of stress conditions depicted in FIG. 4.

$K_{CL\_W}$ is a brightness correction factor for the white subpixels and may be determined from the empirically derived interdependency curves shown in FIG. 4 that relate OLED color shift to $\Delta$VOLED. That measured data can be used to generate the graph of FIG. 5, which plots the brightness correction factor $K_{CL\_W}$ as a function of $\Delta$VOLED for a white pixel. Then assuming that any color shifts in the red, green and blue OLEDs are negligible, brightness correction factors $K_b$, $K_r$ and $K_g$ are computed from the $K_{CL\_W}$ curve, using the same brightness shares for red, green and blue described above. The compensating adjustments for the red, green and blue OLEDs can then be calculated as follows:

$$\Delta R = K_r(R) * \Delta V_{CL\_W}$$

$$\Delta G = K_g(G) * \Delta V_{CL\_W}$$

$$\Delta B = K_b(B) * \Delta V_{CL\_W}$$

The final adjusted values of the gray scales for the red, green and blue OLEDs are calculated by adding the above values $\Delta R$, $\Delta G$ and $\Delta B$ to the values derived from the original gray-scale values.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of maintaining a substantially constant display white point over an extended period of operation of a color display formed by an array of multiple pixels, each of said pixels including multiple subpixels having different colors and white, and each of said subpixels including a light emissive device, said method comprising receiving a video signal, and controlling the color of a selected pixel by controlling the relative levels of energization of the subpixels in the selected pixel based on the video signal, characterized by determining a color shift degradation behavior of a selected subpixel in the selected pixel, said color shift degradation behavior is a shift in the chromaticity coordinates of the selected subpixel and said selected subpixel is a white subpixel, and adjusting the relative levels of energization of the subpixels in the selected pixel to adjust the brightness shares of said subpixels to compensate for said color shift degradation of said selected subpixel, said brightness shares being adjusted to maintain a substantially constant display white point, said brightness shares of said subpixels are adjusted b respective values $\Delta R$ $\Delta G$ $\Delta B$ and $\Delta W$ derived from a sinal $\Delta W_{OLED}$ that represents the aging of the white subpixel, wherein $\Delta R$, $\Delta G$, $\Delta B$, and $\Delta W$ are the adjustment values for red, green, blue and white subpixels in said selected subpixel, wherein said controlling is carried out according to a lookup table mapping the video signal to the relative levels of energization of the subpixels and said adjusting is carried out by dynamically adjusting the lookup table based on the determined color shift degradation behavior.

2. The method of claim 1 in which said light emissive device in each subpixel is an OLED.

3. The method of claim 1 in which said display is an RGBW display.

4. The method of claim 1 in which said color shift degradation behavior is detected by measuring a voltage across said light emissive device in said selected subpixel, and in which said color shift degradation behavior is related to the voltage across said light emissive device by an empirically determined dependency curve.

5. The method of claim 1, further determining a shift in the chromaticity coordinates of the selected subpixel in the selected pixel as said selected subpixel ages.

6. A system for maintaining a substantially constant display white point over an extended period of operation of a color display, said system comprising a color display formed by an array of multiple pixels, each of said pixels including multiple subpixels having different colors and white and each of said subpixels including a light emissive device, drive circuitry for energizing the subpixels of a selected pixel and controlling the color of each selected pixel by controlling the relative levels of energization of the subpixels in the selected pixel based on a video signal, characterized by a controller monitoring a color shift degradation behavior of a selected subpixel in the selected pixel and adjusting the relative levels of energization of the subpixels in the selected pixel to adjust the brightness shares of said subpixels to compensate for said color shift degradation of said selected subpixel, said color shift degradation behavior is a shift in the chromaticity coordinates of the selected subpixel, said brightness shares being adjusted to maintain a substantially constant display white point, said selected subpixel is a white subpixel, and said controller adjusts the brightness shares of said subpixels by respective values of $\Delta R$, $\Delta G$, $\Delta B$, and $\Delta W$ derived from a signal $\Delta W_{OLED}$ that represents the aging of the white subpixel, wherein $\Delta R$, $\Delta G$, $\Delta B$, and $\Delta W$ are the adjustment values for red, green, blue and white subpixels in said selected subpixel, wherein said controlling is carried out according to a lookup table mapping the video signal to the relative levels of energization of the subpixels and said adjusting is carried out by dynamically adjusting the lookup table based on the determined color shift degradation behavior.

7. The system of claim 6 in which said light emissive device in each subpixel is an OLED.

8. The system of claim 6 in which said display is an RGBW display.

9. The system of claim 6 in which said color shift degradation behavior is detected by measuring a voltage across said light emissive device in said selected subpixel, and in which said color shift degradation behavior is related to the voltage across said light emissive device by an empirically determined dependency curve.

* * * * *